United States Patent
Anderson

(10) Patent No.: US 10,298,357 B2
(45) Date of Patent: May 21, 2019

(54) POLARIZATION-BASED WAVELENGTH MULTIPLEXER

(71) Applicant: Cisco Technology, Inc., San Jose, CA (US)

(72) Inventor: Sean P. Anderson, Macungie, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/637,905

(22) Filed: Jun. 29, 2017

(65) Prior Publication Data

US 2019/0007157 A1 Jan. 3, 2019

(51) Int. Cl.
  *G02B 6/126* (2006.01)
  *H04J 14/02* (2006.01)
  *H04J 14/06* (2006.01)

(52) U.S. Cl.
  CPC .............. *H04J 14/06* (2013.01); *G02B 6/126* (2013.01); *H04J 14/02* (2013.01)

(58) Field of Classification Search
  CPC ................................ G02B 6/126; H04J 14/06
  See application file for complete search history.

(56) References Cited

U.S. PATENT DOCUMENTS

| 8,873,899 B2 | 10/2014 | Anderson et al. |
| 9,128,242 B2* | 9/2015 | Kojima .................. G02B 6/14 |
| 9,810,842 B2* | 11/2017 | Oka ....................... G02B 6/126 |
| 2004/0096141 A1* | 5/2004 | Singh ................ G02B 6/12007 |
| | | 385/11 |

OTHER PUBLICATIONS

Mizuno, T.; Oguma, M.; Kitoh, T.; Inoue, Y.; Takahashi, H., "Lattice-form CWDM interleave filter using silica-based planar lightwave circuit," in Photonics Technology Letters, IEEE , vol. 18, No. 15, pp. 1570-1572, Aug. 2006. [Abstact Only] [Available Online] http://ieeexplore.ieee.org/document/1652955/.

Chu, S.T.; Little, B.E.; Pan, W.; Kaneko, T.; Sato, S.; Kokubun, Y., "An eight-channel add-drop filter using vertically coupled microring resonators over a cross grid," in Photonics Technology Letters, IEEE , vol. 11, No. 6, pp. 691-693, Jun. 1999. [Abstract Only] [Available Online] http://ieeexplore.ieee.org/abstract/document/766787/.

(Continued)

*Primary Examiner* — Omar R Rojas

(74) *Attorney, Agent, or Firm* — Patterson + Sheridan, LLP

(57) ABSTRACT

The present disclosure discloses a photonic chip. The photonic chip receives a first optical signal and a second optical signal with different wavelengths from two optical sources, respectively. The photonic chip includes a polarization multiplexing element (PME). The PME receives the first and the second optical signals from the first and the second optical sources respectively and combines the first and the second optical signals into a single optical path. The PME polarizes the first optical signal to have a different polarization than the second optical signal and transmits the combined first and the second optical signals in a common waveguide.

20 Claims, 7 Drawing Sheets

(56) References Cited

OTHER PUBLICATIONS

He, J., Lamontagne, B., Delage, A., Erickson, L., Davies, M., & Koteles, E. (1998). Monolithic Integrated Wavelength Demultiplexer Based on a Waveguide Rowland Circle Grating in InGaAsP / InP. Journal of Lightwave Technology, IEEE, 16(4), 631-638. [Abstract Only] [Available Online] http://ieeexplore.ieee.org/document/664075/.

Castro, J. M., Geraghty, D. F., Honkanen, S., Greiner, C. M., Iazikov, D., & Mossberg, T. W. (2006). Optical add-drop multiplexers based on the antisymmetric waveguide Bragg grating. Applied Optics, 45(6), 1236-43. [Abstract Only] [Available Online] https://www.osapublishing.org/ao/abstract.cfm?uri=ao-45-6-1236.

* cited by examiner

ALIGNMENT TAP WIRING

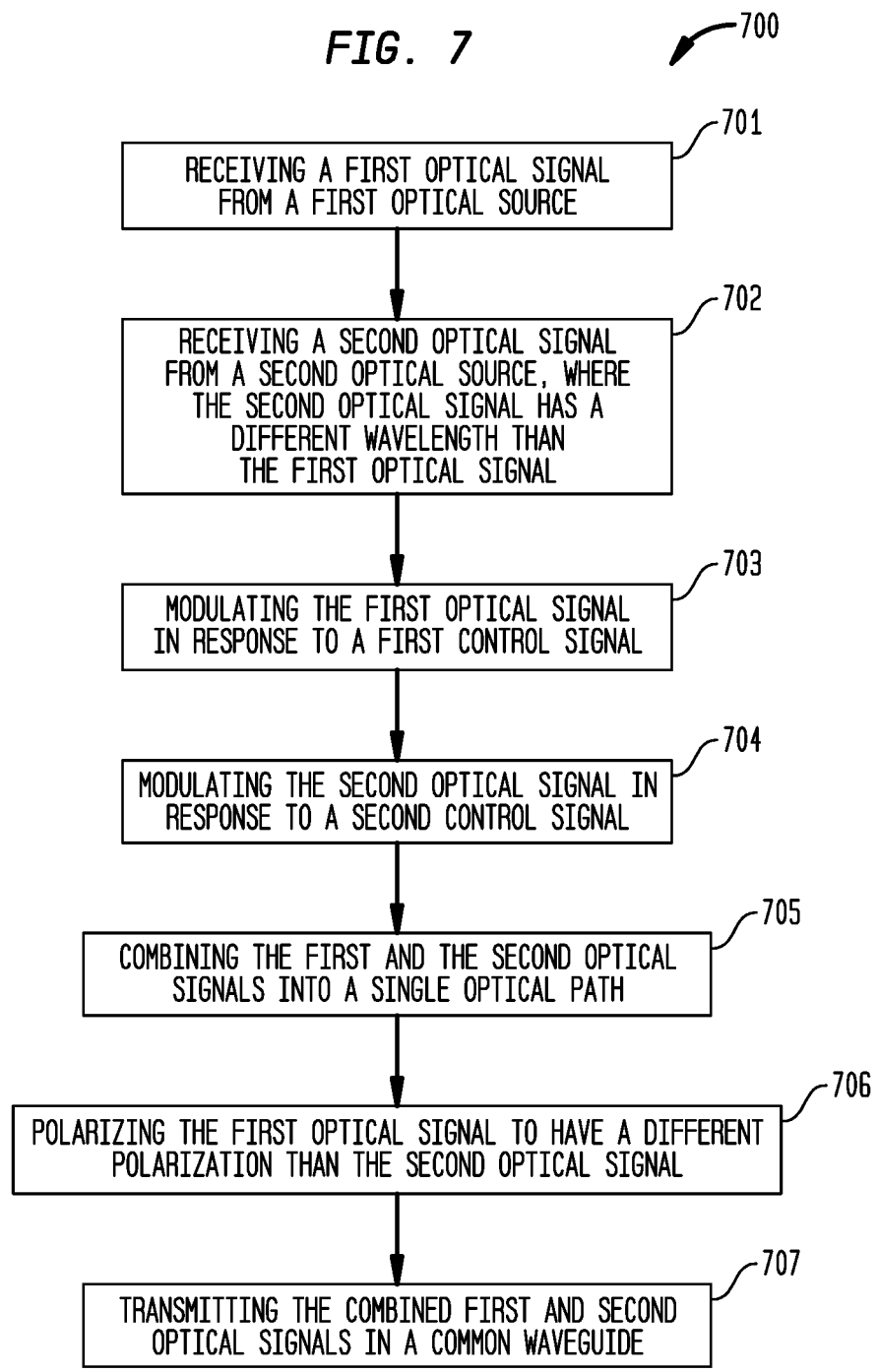

POLARIZATION-BASED WAVELENGTH MULTIPLEXER

BACKGROUND

In optical communications, wavelength-division multiplexing (WDM) is a technology which transmits multiple optical signals with different wavelengths in a single waveguide, e.g., a single optical fiber, from an optical transmitter to an optical receiver. In a WDM optical system, the optical transmitter uses a multiplexer to combine multiple optical signals with different wavelengths and transmits the combined optical signals in a single waveguide to the optical receiver. The optical receiver uses a de-multiplexer to separate the combined optical signals for further processing.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 7 illustrates a flowchart of a method for transmitting two optical signals with different wavelengths, according to one embodiment herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
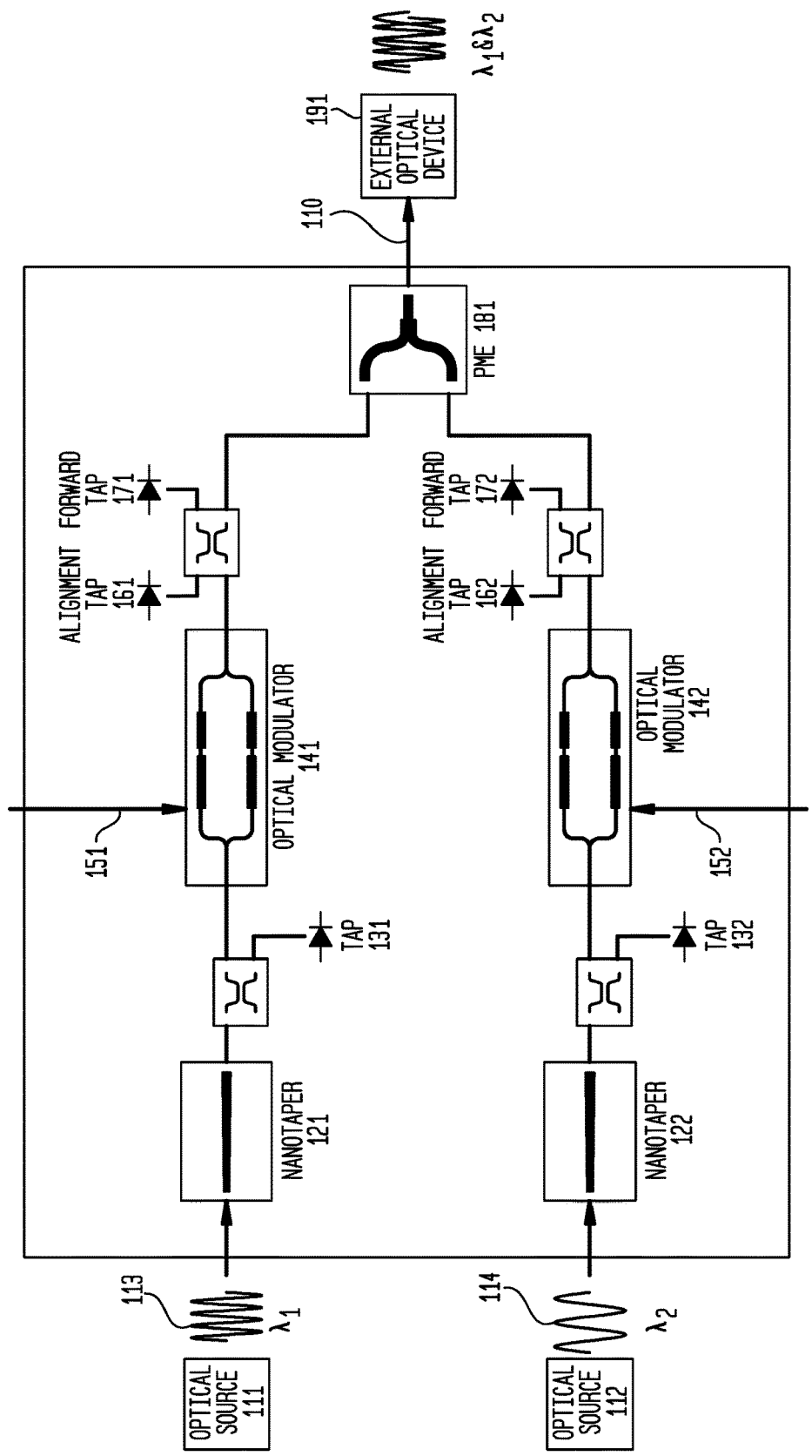
FIG. 1 illustrates an optical system, according to one embodiment herein.

One embodiment presented in this disclosure discloses a photonic chip. The photonic chip includes a first optical source configured to transmit a first optical signal comprising a first wavelength. The photonic chip includes a second optical source configured to transmit a second optical signal comprising a second wavelength different than the first wavelength. The photonic chip further includes a polarization multiplexing element coupled to outputs of the first and the second optical sources. The polarization multiplexing element is configured to: receive the first and the second optical signals from the first and the second optical sources at respective inputs; combine the first and the second optical signals into a single optical path; polarize the first optical signal to have a different polarization than the second optical signal; and transmit the combined first and the second optical signals in a common waveguide.

Another embodiment presented in this disclosure discloses a system. The system includes a first optical source configured to transmit a first optical signal, wherein the first optical signal comprises a first wavelength and a second optical source configured to transmit a second optical signal, wherein the second optical signal comprises a second wavelength different than the first wavelength. The system also includes a photonic chip. The photonic chip includes a polarization multiplexing element configured to: receive the first and the second optical signals from the first and the second optical sources at respective inputs; combine the first and the second optical signals into a single optical path; polarize the first optical signal to have a different polarization than the second optical signal; and transmit the combined first and the second optical signals in a common waveguide.

Another embodiment presented in this disclosure discloses a method. The method includes receiving a first optical signal from a first optical source, wherein the first optical signal comprises a first wavelength and receiving a second optical signal from a second optical source, where the second optical signal comprises a second wavelength different than the first wavelength. The method also includes combining the first and the second optical signals into a single optical path using a polarization multiplexing element. The method further includes polarizing the first optical signal to have a different polarization than the second optical signal using the polarization multiplexing element and transmitting the combined first and the second optical signals in a common waveguide.

Example Embodiments

Many optical systems use interleavers to combine optical signals with different wavelengths to achieve WDM. However, interleavers can cause high insertion loss in the optical systems and require active control which increases the complexity of the optical systems. Moreover, interleavers can only combine optical signals with specific predetermined wavelengths. That is, interleavers cannot be used in optical signals where the wavelengths of the optical signal change.

In one embodiment, an optical system includes two optical sources which transmit a first optical signal and a second optical signal, respectively, with different wavelengths onto a photonic chip. The photonic chip includes a first optical modulator which modulates the first optical signal and a second modulator which modulates the second optical signal. The photonic chip also includes a polarization multiplexing element (PME) which receives respective outputs from the first and the second optical modulators and combines these outputs into a single optical path. In one embodiment, the PME polarizes one of the optical signals received from the modulators to have a different polarization than the other output optical signal and transmits a combined output in a common waveguide to an external optical device.

FIG. 1 illustrates an optical system 100, according to one embodiment herein. The optical system 100 includes two optical sources 111 and 112. In one embodiment, the optical sources 111 and 112 generate two optical signals with two different wavelengths, respectively. For example, as shown in FIG. 1, the optical source 111 generates a first optical signal 113 with a wavelength $\lambda_1$, and the optical source 112 generates a second optical signal 114 with a wavelength $\lambda_2$ which is different than $\lambda_1$.

The optical sources 111 and 112 can be two lasers or other optical sources as understood in the art. In one embodiment, the optical signals 113 and 114 have optical powers that range from 10 to 30 milli-Watts (mW). In one embodiment, the wavelengths $\lambda_1$ and/or $\lambda_2$ are determined by standards such as Local Area Network-WDM (LAN-WDM), Corse-WDM (CWDM) or Dense-WDM (DWDM).

The two optical sources 111 and 112 transmit the two optical signals 113 and 114 to a photonic chip 101 for further processing. In one embodiment, the two optical signals 113 and 114 have the same polarization. For example, the two optical signals 113 and 114 are both transverse electric (TE) polarized light or transverse magnetic (TM) polarized light. As shown in FIG. 1, the optical source 111 is optically coupled with the nanotaper 121 in the photonic chip 101. For example, the optical source 111 can be aligned to the nanotaper 121 using either passive or active alignment such that the optical signal 113 can be transmitted from the optical source 111 to the nanotaper 121. Similarly, the optical source 112 is optically coupled with the nanotaper 122 in the photonic chip 101 so that the optical signal 114 can be transmitted from the optical source 112 to the nanotaper 122.

In one embodiment, the optical signals 113 and 114 are maintained in a same polarization as the signals 113 and 115 propagate through the nanotapers 121 and 122. In one embodiment, the nanotaper 121 and the nanotaper 122 maintain the optical signal 113 and the optical signal 114 in the same optical mode. In one embodiment, the nanotaper 121 and the nanotaper 122 reduce the size of the modes—e.g., confine the energy of the optical signals into a smaller cross sectional area. In one example, the optical signals 113 and 114 are a first-order TE mode optical signal but can be higher order TE modes as well. In one embodiment, the optical signals 113 and 114 have the same polarization and are confined in the same mode.

The optical signal 113 is transmitted from the nanotaper 121 to an optical modulator 141 through a tap 131 via the waveguide in the photonic chip 101. Similarly, the optical signal 114 is transmitted from the nanotaper 122 to an optical modulator 142 through a tap 132 via the waveguide in the photonic chip 101. In one embodiment, the taps 131 and 132 are used to monitor and/or control the power of the optical signals 113 and 114, respectively. For example, the tap 131 can divert a small fraction, e.g., 10%, of the power of the optical signal 113 to a diode of the tap 131. Thus, the optical signal 113 is transmitted from the nanotaper 121 to the optical modulator 141 with only 90% of the power. The tap 132 can control the power of the optical signal 114 similarly. In this way, the taps 131 and 132 can be used to monitor and determine the power of the optical signals being transmitted to the optical modulators 141 and 142, respectively.

The optical modulators 141 and 142 modulate the two optical signals 113 and 114, respectively, to carry data information. In one embodiment, the optical modulators 141 and 142 are Mach-Zehnder interferometer (MZI) modulators, e.g., 28 GHz MZI modulators. For example, the MZI modulators can modulate the optical signals 113 and 114 according to well-known modulation schemes such as quadrature phase-shift keying (QPSK), quadrature amplitude modulation (QAM), pulse amplitude modulation (PAM), or binary phase-shift keying (BPSK), as understood in the art. In one embodiment, the optical modulators 141 and 142 modulate the two optical signals 113 and 114 according to modulation control signals 151 and 152 respectively. For example, the modulation control signals 151 and 152 can be analog modulation control signals generated by an analog local oscillator (not shown in FIG. 1 for simplicity of illustration) in the photonic chip 101 to transmit data using the optical signals 113 and 114.

The optical modulators 141 and 142 output the modulated optical signals 113 and 114 respectively to the PME 181 in the photonic chip 101. As shown in FIG. 1, the PME 181 is coupled to the output of the optical modulator 141 through an alignment tap 161 and a forward tap 171. Also, the PME 181 is coupled to the output of the optical modulator 142 through an alignment tap 162 and a forward tap 172.

In one embodiment, the alignment tap 161 is used to align the PME 181 to an external optical device 191, e.g., an external fiber. In one embodiment, the forward tap 171 is used to monitor and/or control the power of the optical signal 113 output from the optical modulator 141. For example, the forward tap 171 can divert a small fraction, e.g., 10%, of the power of the optical signal 113 to a diode of the forward tap 171. Thus, the optical signal 113 is transmitted from the output of the optical modulator 141 to the PME 181 with only 90% of the power.

Similarly, the modulated optical signal 114 is transmitted from the output of the optical modulator 142 to the PME 181 through the alignment tap 162 and the forward tap 172 via the waveguide in the photonic chip 101. In one embodiment, the alignment tap 162 is used to align the PME 181 to the external optical device 191. In one embodiment, the forward taps 171 and 172 can be used to monitor and determine the power of the optical signals being transmitted to the PME 181.

The PME 181 receives the modulated optical signal 113 from the output of the optical modulator 141 at a first input of the PME 181. Also, the PME 181 receives the modulated optical signal 114 from the output of the optical modulator 142 at a second input of the PME 181. In one embodiment, the PME 181 combines the modulated optical signals 113 and 114 into a single optical path, e.g., a single waveguide. The PME 181 also polarizes one of the two optical signals to have a different polarization from the other optical signal. For example, the PME 181 can polarize the optical signal 113 to have a different polarization from the optical signal 114. In this example, the PME 181 does not change the polarization of the optical signal 114. After changing the polarization of one of the optical signals, the PME 181 transmits the combined optical signals 113 (with wavelength $\lambda_1$) and 114 (with wavelength $\lambda_2$) in a common connection such as a common waveguide 110 to the external optical device 191. The specific structure of the PME 181 is described in detail below. In other embodiments, the common connection 110 between the PME 181 and the external optical device 191 can be free space or constructed by a bulk material such as silicon dioxide (SiO2).

FIG. 1 illustrates only one embodiment of the optical system 100. As understood in the art, in other embodiments, the photonic chip 101 may not include nanotapers. In other embodiments, the photonic chip 101 may include a different number of nanotapers. In other embodiments, the photonic chip 101 may include a different number of taps. In other embodiments, the PME 181 may not receive the optical signals from the optical modulators 141 and 142. Instead, the PME 181 can receive optical signals from directly-modulated lasers (DMLs) or from other optical sources as understood in the art.

The embodiment in FIG. 1 illustrates that the PME 181 can combine two optical signals with two different wavelengths. In other embodiments, the PME 181 can combine more than two optical signals with different wavelengths from each other. For example, the first input of the PME 181 can receive a combined optical signal including a first and second optical signals with wavelengths $\lambda_1$ and $\lambda_2$, respectively. In one embodiment, the first and second optical signals can be combined by an interleaver or another PME in the photonic chip 101 before being received by the PME 181. The second input of the PME 181 can receive a combined optical signal including a third and fourth optical signals with wavelengths $\lambda_3$ and $\lambda_4$, respectively. In one embodiment, the third and fourth optical signals can be combined by an interleaver or another PME in the photonic chip 101 before being received by the PME 181. The four wavelengths $\lambda_1$, $\lambda_2$, $\lambda_3$ and $\lambda_4$ are different from each other. The PME 181 can combine the four optical signals with four different wavelengths into a single optical path. Generally, each of the two inputs of the PME 181 can receive a combined optical signal including an arbitrary number of optical signals with different wavelengths.

Figure 2:
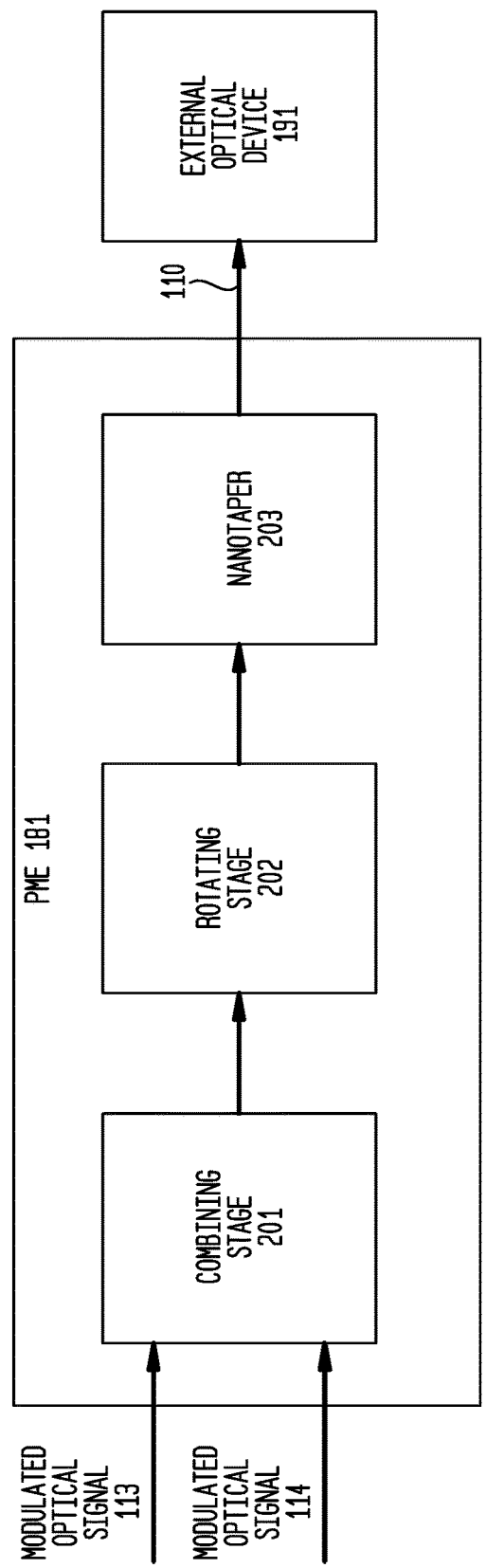
FIG. 2 illustrates a polarization multiplexing element (PME), according to one embodiment herein.

FIG. 2 illustrates the PME 181, according to one embodiment herein. As shown, the PME 181 is a waveguide structure including a combining stage 201, a rotating stage 202 and a nanotaper 203. In one embodiment, the combining stage 201 receives the two modulated optical signals 113 and 114 from the optical modulators 141 and 142, respectively. The combining stage 201 combines and/or confines the two modulated optical signals 113 and 114 into a single optical path, e.g., a single waveguide. The combining stage 201 transmits the combined optical signals 113 and 114 to the rotating stage 202.

The rotating stage 202 rotates one of the two optical signals such that the rotated optical signal has a different polarization from the un-rotated optical signal. For example, in the case that the modulated optical signals 113 and 114 input to the PME 181 are all TE optical signals, the PME 181 can rotate the optical signal 113 such that the optical signal 113 is a TM polarized signal. That is, the PME 181 changes the polarization of the optical signal 113 from TE to TM. In this example, the PME 181 does not rotate or change the polarization of the optical signal 114, i.e., the PME 181 maintains the polarization of the optical signal 114 such that the optical signal 114 is still a TE optical signal.

The rotating stage 202 transmits the combined optical signals 113 and 114 (one of them is rotated by the rotating stage 202) to the nanotaper 203. In one embodiment, the nanotaper 203 transmits the combined optical signals 113 and 114 to the external optical device 191 through a common waveguide 110 between the nanotaper 203 and the external optical device 191. In one embodiment, the optical signals 113 and 114 output from the rotating stage 202 have orthogonal polarizations, e.g., the rotated optical signal 103 is a TM mode optical signal and the un-rotated optical signal 114 is a TE mode optical signal. Thus, the nanotaper 203 can transmit the combined optical signals 113 and 114 to the external optical device 191 through the common waveguide 110 without interference between the optical signals 113 and 114. This is because the optical signals 113 and 114 with orthogonal polarizations do not interfere with each other when transmitted together in the common waveguide 110. Embodiments of the PME 181 will be described in detail below.

Figure 3:
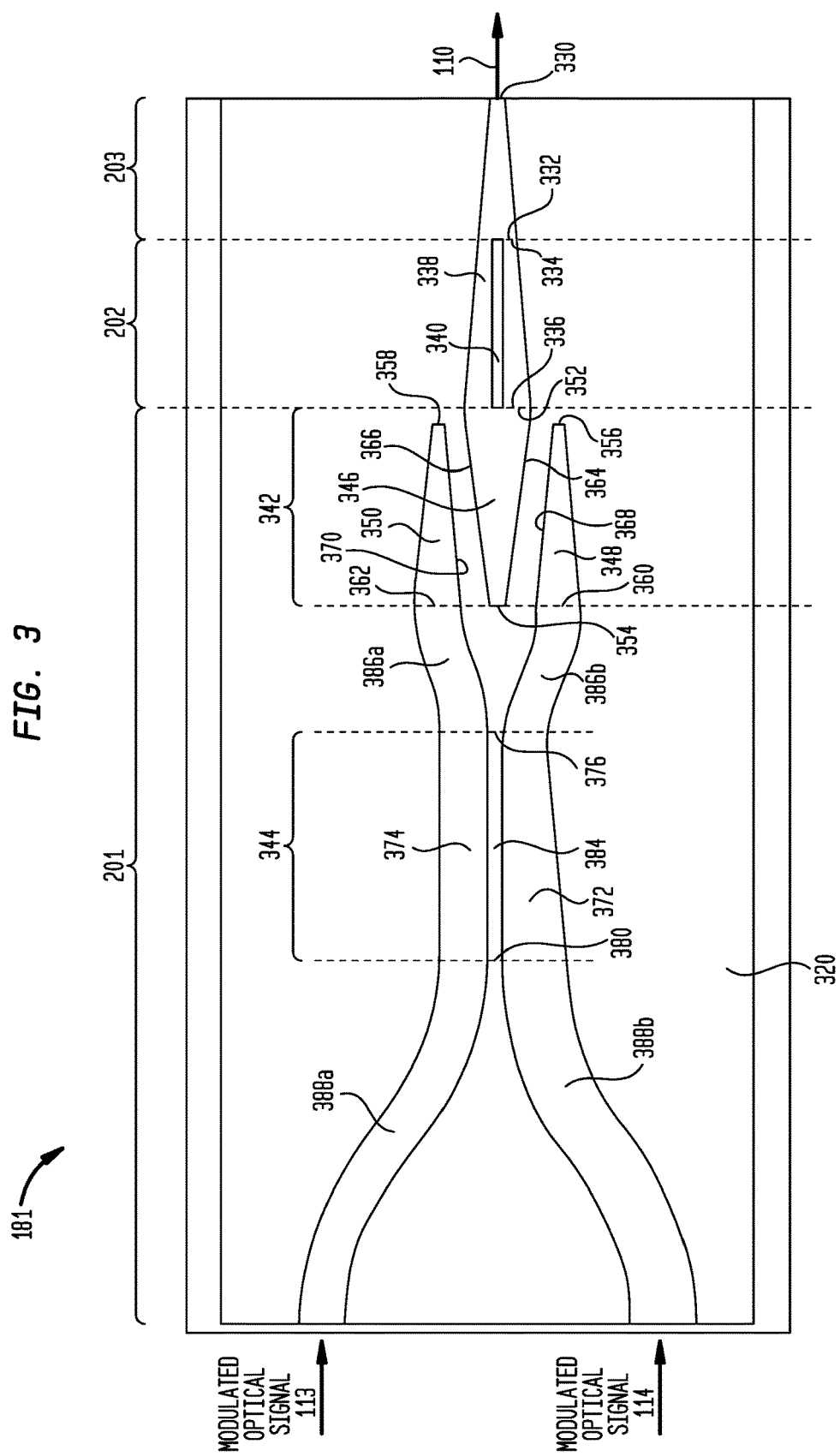
FIG. 3 illustrates the structure of the PME, according to one embodiment herein.

FIG. 3 illustrates the structure of the PME 181, according to one embodiment herein. As described above, the modulated optical signals 113 and 114 (output from the optical modulators 141 and 142 respectively) are input to the PME 181. In one embodiment, the PME 181 is included or fabricated on a substrate of the photonic chip 101.

As shown in FIG. 3, the modulated signal 113 is inputted to a waveguide path 388a in the combining stage 201. Similarly, the modulated signal 114 is input to a waveguide path 388b in the combining stage 201. The waveguide paths 388a and 388b are coupled to the first optical modulator 141 and the second optical modulator 142, respectively. The waveguide paths 388a and 388b form a coupling portion to couple the modulated optical signals 113 and 114 to the PME 181. In one embodiment, the waveguide paths 388a and 388b are S-shaped bends (or S-bends) as shown in FIG. 3. In other embodiments, the waveguide paths 388a and 388b can be other shaped waveguide paths, as understood in the art. In one embodiment, the width of the waveguide path 388a is narrower or smaller than the width of the waveguide path 388b. In another embodiment, the width of the waveguide path 388a can be wider or larger than the width of the waveguide path 388b. In another embodiment, the width of the waveguide path 388a can be the same as the width of the waveguide path 388b.

The modulated optical signals 113 and 114 propagate through the waveguide paths 388a and 388b respectively to a coupler portion 344 in the combining stage 201. In one embodiment, the coupler 344 is a two-by-two (2×2) or three decibel (3 dB) coupler. The 2×2 (or 3 dB) coupler 344 includes two parallel waveguide paths 374, 372 extending from a first end 380 of the 2×2 coupler 344 to a second end 376 of the 2×2 coupler 344. The waveguide path 374 is connected to the waveguide path 388a while the waveguide path 374 is connected to the waveguide path 388b. As shown, the width of the waveguide path 374 is narrower than the width of the waveguide path 372. In another embodiment, the width of the waveguide path 374 can be wider than the width of the waveguide path 372. In another embodiment, the widths of the waveguide paths 372, 374 can be the same.

In FIG. 3, the 2×2 coupler 344 is asymmetric at the first end 380. That is, the widths of the waveguide paths 372, 374 at the first end 380 are different. On the other hand, the coupler 344 is symmetric at the second end 376. That is, the widths of the waveguide paths 372, 374 at the second end 376 are the same. To achieve the asymmetry at the first end 380, the waveguide path 374 has a substantially constant width as the path 374 extends through the coupler 344. In one embodiment, the width of the waveguide path 374 is the same as the width of the waveguide path 388a. On the other hand, the waveguide path 372 tapers between the first and second ends 380 and 376. That is, the width of the waveguide path 372 is larger than the width of the waveguide path 374 at the first end 380. However, the width of the waveguide path 372 decreases from the first end 380 to the second end 376. In one embodiment, the width of the waveguide path 372 at the first end 380 is the same as the width of the waveguide path 388b.

In one embodiment, the coupler 344 couples the pair of optical signals 113 and 114 such that part of the energy for each of the optical signals 113 and 114 propagates through the waveguide path 374 and the remaining part of the energy for each of the optical signals 113 and 114 propagates through the waveguide path 372. In one example, the modulated optical 113 entering the waveguide path 388a has the same power as the modulated optical 114 entering the waveguide path 388b. In this example, at the end of the coupler 344, the optical signals at the end of the waveguide path 374 coupled to the waveguide 386a include half energy of the optical signal 113 (with wavelength $\lambda_1$) and half energy of the optical signal 114 (with wavelength $\lambda_2$). Similarly, the optical signals at the end of the waveguide path 372 coupled to the waveguide 386b include another half energy of the optical signal 113 (with wavelength $\lambda_1$) and another half energy of the optical signal 114 (with wavelength $\lambda_2$). That is, the optical signals propagating through the waveguide paths 372 and 374 include mixed optical signals 113 and 114. In another example, if the power of the modulated optical 113 entering the waveguide path 388a is different from the power of the modulated optical 114 entering the waveguide path 388b, the optical signals propagating through the waveguide paths 372 and 374 may include mixed optical signals 113 and 114 with different energy. The first and second parallel waveguide paths 374 and 372 are spaced apart by an appropriate width or spacing 384 to achieve better coupling.

In one embodiment, the coupler 344 has an adiabatic optical waveguide structure. In one embodiment, the coupler 344 has a sufficient length so that the coupling of the pair of optical signals 113 and 114 is performed with minimal energy loss and high isolation as the optical signals 113 and 114 propagate through the coupler 344. For example, the 2×2 coupler 344 may have a length in a range of about 40 to 50 microns.

Two waveguide paths 386a and 386b are coupled to the second end 376 of the 2×2 coupler 344. The waveguide paths 386a and 386b are S-shaped bends (or S-bends) as shown in FIG. 3. In other embodiments, the waveguide paths 386a and 386b may be differently shaped waveguide paths, such as straight-shaped waveguide paths or curved paths other than S-shaped. The optical signals output from the waveguide path 374 are propagated to the waveguide path 386a, and the optical signals output from the waveguide path 372 are propagated to the waveguide path 386b. Thus, the optical signals propagating through the waveguide path 386a include part (e.g., half energy) of the optical signal 113 (with wavelength $\lambda_1$) and part (e.g., half energy) of the optical signal 114 (with wavelength $\lambda_2$). Similarly, the optical signals propagating through the waveguide path 386b include the remaining part (e.g., another half energy) of the optical signal 113 (with wavelength $\lambda_1$) and the remaining part (e.g., another half energy) of optical signal 114 (with wavelength $\lambda_2$).

The waveguide paths 386a and 386b are coupled to a splitter portion 342. In one embodiment, the splitter portion 342 is a Y-splitter as shown in FIG. 3. The Y-splitter 342 includes two tapering portions 350, 348 and an inverse tapering portion 346 to receive and combine the optical signals 113 and 114 into a single optical waveguide path. The two tapering portions 350 and 348 have respective first ends 362 and 360 which are located at or near a first end 354 of the inverse tapering portion 346. The two tapering portions 350 and 348 have respective second ends 358 and 356 which are located at or near a second end 352 of the inverse tapering portion 346. The waveguide paths 386a and 386b are connected to the two tapering portions 350 and 348 at the first ends 362 and 360 respectively.

The inverse tapering portion 346 includes opposing sides 366 and 364 that extend from the first end 354 to the second end 352 of the inverse tapering portion 346. The tapering portion 350 includes a side 370 that faces and extends substantially parallel with the opposing side 366 of the inverse tapering portion 346. Similarly, the tapering portion 348 includes a side 368 that faces and extends substantially parallel with the side 364 of the inverse tapering portion 346. The sides 366 and 370 determine a spacing or separation between the inverse tapering portion 346 and the tapering portion 350. The sides 364 and 368 determine a spacing or separation between the inverse tapering portion 346 and the tapering portion 348.

The Y-splitter 342 combines the pair of optical signals 113 and 114 into a single waveguide path. For example, optical signals including part of the optical signals 113 and 114 propagate through the waveguide path 386a to the tapering portion 350. Also, optical signals including the remaining part of the optical signals 113 and 114 propagate through the waveguide path 386a to the tapering portion 348. The inverse tapering portion 346 combines the optical signals from the tapering portion 350 and the tapering portion 348 into a single waveguide path. In one embodiment, the inverse tapering portion 346 forms the single waveguide path. For example, the inverse tapering portion 346 combines the optical signals from the tapering portion 350 and the tapering portion 348 such that all or substantially all of the energy from the optical signals is confined into the single waveguide path (e.g., the inverse tapering portion 346). That is, after the combination, the optical signals propagating through the inverse tapering portion 346 include all or substantially all of the optical signal 113 (with wavelength $\lambda_1$) and the optical signal 114 (with wavelength $\lambda_2$).

The combined optical signals propagate from the inverse tapering portion 346 to a rotating stage 202 in the PME 181. In one embodiment, the inverse tapering portion 346 and the rotating stage 202 are connected to form the single waveguide path that the combined optical signals propagate through. As shown in FIG. 3, the rotating stage 202 includes a base portion 338 and a rib portion 340. The rib portion 340 may be made of the same material or a different material as the base portion 380. In one embodiment, the base portion 338 has a generally planar structure. In one embodiment, the base portion 338 tapers such that the width of the base portion 338 decreases from a first end 336 to a second end 334 of the base portion 338. In one embodiment, the first end 336 of the base portion 338 is the second end 352 of the inverse tapering portion 346.

As shown in FIG. 3, in one embodiment, the rib portion 340 of the rotating stage 202 is a relatively thin strip of material that is disposed on or that extends or protrudes from a planar surface of the base portion 338. The rib portion 340 extends an entire length of the rotating stage 202, from the first end 336 to the second end 334 in the direction of propagation of the combined optical signals. In other embodiments, the rib portion 340 may not extend the entire length of the rotating stage 202.

As shown in FIG. 3, in one embodiment, the rib portion 340 has a width that is less than the width of the base portion 338. In one embodiment, the width of the rib portion 340 may be substantially uniform as the rib portion 340 extends from the first end 336 to the second end 334. For example, the uniform width of the rib portion 340 may be about 150 nanometers.

In one embodiment, the rotating stage 202 rotates or polarizes one of the two optical signals 113 and 114 such that the rotated optical signal has a different polarization than the un-rotated optical signal. In one embodiment, the rotating stage 202 rotates the optical signal propagating through a narrower waveguide path in the combining stage 201. For example, in FIG. 3, the waveguide path 388a is narrower than the waveguide path 388b. Thus, the rotating stage 202 rotates the optical signal 113 propagating through the narrower waveguide path 388a. In this example, the rotating stage 202 does not rotate the optical signal 114 propagating through the wider waveguide path 388b. Thus, the rotating stage 202 changes the polarization of the optical signals 113 which have a wavelength $\lambda_1$ but not the optical signals 114 which have a wavelength of $\lambda_2$. Conversely, if the waveguide path 388b is narrower than the waveguide path 388a, then the rotating stage 202 rotates the optical signals 114 propagating through the narrower waveguide path 388b.

In one embodiment, the rotating stage 202 rotates or polarizes one of the two optical signals 113 and 114 such that the two optical signals 113 and 114 have orthogonal polarizations with respect to each other. For example, in the case that the modulated optical signals 113 and 114 input to the PME 181 are all TE optical signals, the rotating stage 202 can rotate the optical signal 113 such that the optical signal 113 has a TM polarization. In this example, the rotating stage 202 does not rotate or change the polarization of the optical signal 114, i.e., the optical signal 114 is still a TE optical signal. Thus, after propagating through the rotating stage 202, the optical signal 113 is a TM mode optical signal and the optical signal 114 is still a TE mode optical signal, i.e., the two optical signals 113 and 114 have orthogonal polarizations with respect to each other. Put differently, a TM polarized optical signal with a wavelength of $\lambda_1$ is propagating in the same waveguide as a TE polarized optical signal with a wavelength of $\lambda_2$.

In another example, in the case that the modulated optical signals 113 and 114 input to the PME 181 are both TM optical signals, the rotating stage 202 can rotate the optical signal 113 such that the optical signal 113 has a TE polarization. Thus, after propagating through the rotating stage 202, the optical signal 113 is a TE optical signal and the optical signal 114 is still a TM optical signal, i.e., the two optical signals 113 and 114 have orthogonal polarizations with respect to each other.

In one embodiment, the rotating stage 202 has an adiabatic structure, such that the polarization can be performed with minimal loss and high isolation between the two optical signals 113 and 114. In one embodiment, the rotating stage 202 has a sufficient length so that the polarization can be performed gradually to ensure minimal loss and high isolation. For example, the length of the rotating stage 202 can be about 50 microns.

As described above, the combined optical signals 113 and 114 propagate through the rotating stage 202. After propagating through the rotating stage 202, the combined optical signals 113 and 114 (one of them is rotated) propagate through the nanotaper 203 in the PME 181. In one embodiment, the nanotaper 203 tapers from a first end 332 to a second end 330. In one embodiment, the first end 332 of the nanotaper 203 is the second end 334 of the base portion 338 in the rotating stage 202. In one embodiment, the inverse tapering portion 346, the rotating stage 202 and the nanotaper 203 form the single waveguide path.

The nanotaper 203 receives the pair of optical signals 113 and 114 confined in the single waveguide path (e.g., formed by the inverse tapering portion 346 and the rotating stage 202). In one embodiment, the nanotaper 203 is also part of the single waveguide path. The nanotaper 203 transmits the combined optical signals to the first end 330 or the edge of the photonic chip 101 and to the external optical device 191 through the common waveguide 110, as shown in FIG. 1. In one embodiment, because the optical signals 113 and 114 have orthogonal polarizations after propagating through the rotating stage 202, the nanotaper 203 transmits the combined optical signals 113 and 114 in the single waveguide path without causing interference between the optical signals 113 and 114.

Figure 4:
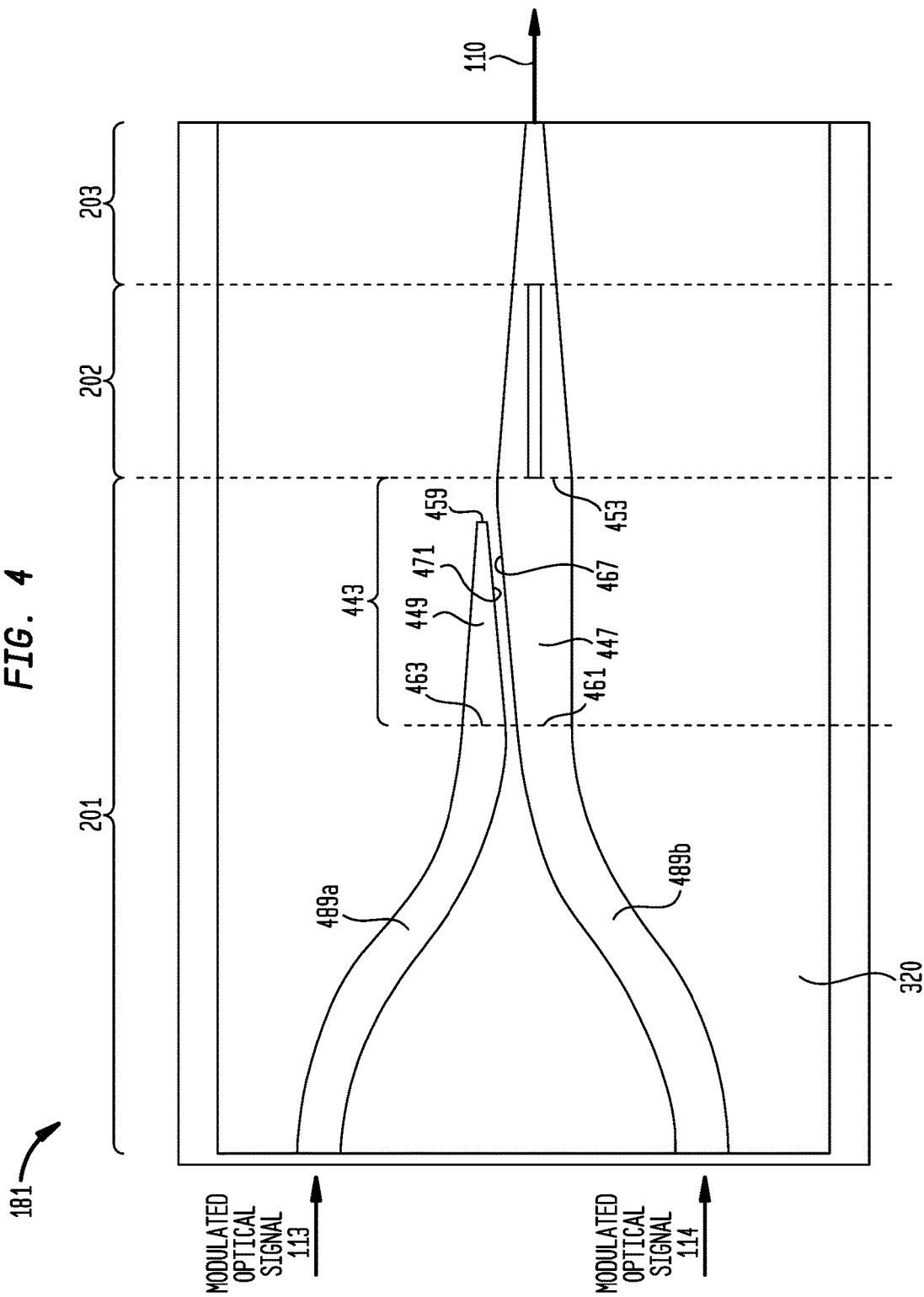
FIG. 4 illustrates the structure of the PME, according to another embodiment herein.

FIG. 4 illustrates the structure of the PME 181, according to another embodiment herein. The PME 181 shown in FIG. 4 has the same rotating stage 202 and the same nanotaper 203 as the PME 181 shown in FIG. 3, which will not be described in detail when describing FIG. 4. However, the PME 181 shown in FIG. 4 has a different combining stage 201. As shown in FIG. 4, the modulated signal 113 is input to a waveguide path 489a in the combining stage 201. Similarly, the modulated signal 114 is input to a waveguide path 489b in the combining stage 201. In one embodiment, the waveguide paths 489a and 489b have different widths, e.g., the width of the waveguide 489a is narrower than the width of the waveguide 489b, as shown in FIG. 4.

The combining stage 201 includes a Y-splitter 443. The Y-splitter 443 includes a tapering portion 449 and an inverse tapering portion 447. The inverse tapering portion 447 has a first end 461 and a second end 453. The tapering portion 449 has a first end 463 and a second end 459. The tapering portion 449 includes a side 471 that faces and extends substantially parallel with a side 467 of the inverse tapering portion 447. The sides 467 and 471 are spaced apart from each other by an appropriate distance or spacing. The inverse tapering portion 447 is connected to the rotating stage 202.

In one embodiment, part of the optical signals 113 and 114 (e.g., half of the energy of each of the optical signals 113 and 114) propagate through the waveguide path 489a to the second end 459 of the tapering portion 449. The remaining part of the optical signals 113 and 114 (e.g., another half of the energy of each of the optical signals 113 and 114) propagate through the waveguide path 489b to the second end 453 of the inverse tapering portion 447. The inverse tapering portion 447 combines the optical signals propagating through the tapering portion 449 and the optical signals propagating through the inverse tapering portion 447 into a single waveguide path. In one embodiment, the tapering portion 449 forms the single waveguide path. That is, the optical signals propagating through the inverse tapering portion 447 include all or substantially all of the optical signal 113 (with wavelength $\lambda_1$) and the optical signal 114 (with wavelength $\lambda_2$). The combined optical signals 113 and 114 are transmitted from the inverse tapering portion 447 to the rotating stage 202.

The rotating stage 202 rotates the optical signal propagating through a narrower waveguide path in the combining stage 201. For example, the rotating stage 202 rotates the optical signal 113 propagating through the narrower waveguide path 489a. In this example, the rotating stage 202 does not rotate the optical signal 114 propagating through the wider waveguide path 489b. After propagating through the rotating stage 202, the combined optical signals 113 and 114 (one of them is rotated) propagate through the nanotaper 203 in the PME 181. As described above, the nanotaper 203 transmits the combined optical signals to the external optical device 191 through the common waveguide 104, as shown in FIG. 1. In one embodiment, the inverse tapering portion 447, the rotating stage 202 and the nanotaper 203 form the single waveguide path.

Figure 5:
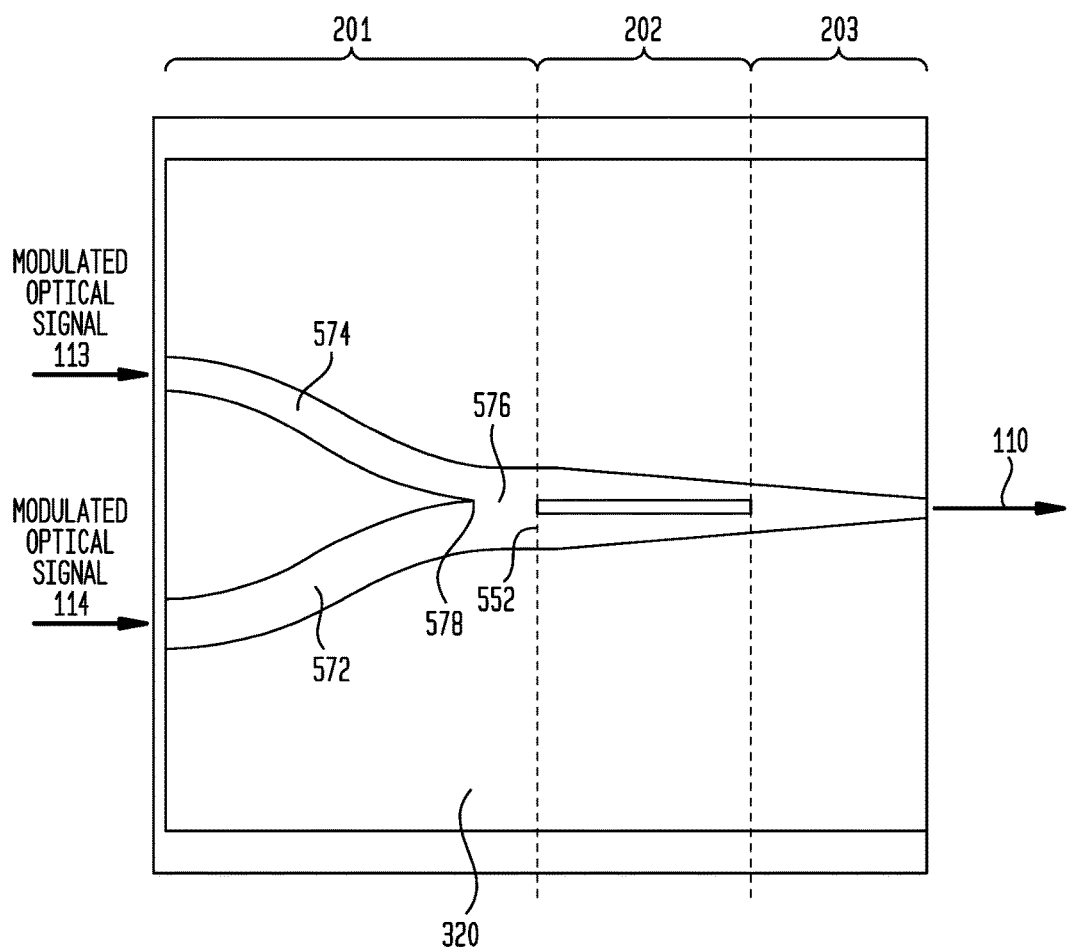
FIG. 5 illustrates the structure of the PME, according to another embodiment herein.

FIG. 5 illustrates the structure of the PME 181, according to another embodiment herein. The PME 181 shown in FIG. 5 has the same rotating stage 202 and the same nanotaper 203 as the PME 181 shown in FIG. 3, which will not be described in detail when describing FIG. 5. However, the PME 181 shown in FIG. 5 has a different combining stage 201. As shown in FIG. 5, the modulated signal 113 is input to a waveguide path 574 in the combining stage 201. Similarly, the modulated signal 114 is input to a waveguide path 572 in the combining stage 201. In one embodiment, the waveguide paths 574 and 572 have different widths, e.g., the width of the waveguide 574 is narrower than the width of the waveguide 572, as shown in FIG. 5.

The combining stage 201 in FIG. 5 includes a single waveguide path 576 having an end 552 connected to the rotating stage 202. In one embodiment, part of the optical signals 113 and 114 (e.g., half of the energy of each of the optical signals 113 and 114) propagate through the waveguide path 574 to the end 522 of the single waveguide path 576. The remaining part of the optical signals 113 and 114 (e.g., another half of the energy of each of the optical signals 113 and 114) propagate through the waveguide path 572 to the end 522 of the single waveguide path 576. The combining stage 201 combines the optical signals propagating through the waveguide path 574 and the optical signals propagating through the waveguide path 572 into the single waveguide path 576 at a position 578. The combined optical signals 113 and 114 are transmitted in the single waveguide path 576 to the rotating stage 202, as described above. The rotating stage 202 rotates one of the two optical signals and the nanotaper 203 transmits the combined optical signals to the external optical device 191 through the common waveguide 110, as described above.

The PME 181 in the photonic chip 101 can combine the two optical signals 113 and 114 with different wavelengths into a single optical path or waveguide path. Also, the PME 181 can transmit the combined optical signals 113 and 114 to an external optical device 191 through a common waveguide 110 without causing interference between the optical signals 113 and 114. With the PME 181 in the photonic chip 101, there is no need to use an interleaver in the photonic chip 101 to combine the optical signals 113 and 114. That is, the photonic chip 101 including the PME 181 does not include an interleaver for combining the optical signals 113 and 114. Also, there is no restriction of the difference between $\lambda_1$ and $\lambda_2$. That is, the difference or separation between $\lambda_1$ and $\lambda_2$ can be flexible and very large, e.g., 100 nanometers. In practical applications, the difference between $\lambda_1$ and $\lambda_2$ can be in a range from 5-20 nanometers. In one embodiment, the PME 181 can combine optical signals having dynamic wavelengths. For example, the photonic chip 101 can receive the optical signals 113 and 114 with dynamic (not fixed) wavelengths $\lambda_1$ and $\lambda_2$ from the optical sources 111 and 112, respectively. The PME 181 can combine the two optical signals 113 and 114 with dynamic (not fixed) wavelengths $\lambda_1$ and $\lambda_2$, similarly as described above. In this manner, the optical system can receive optical signals with varying wavelengths and still operate as described above.

Figure 6A:
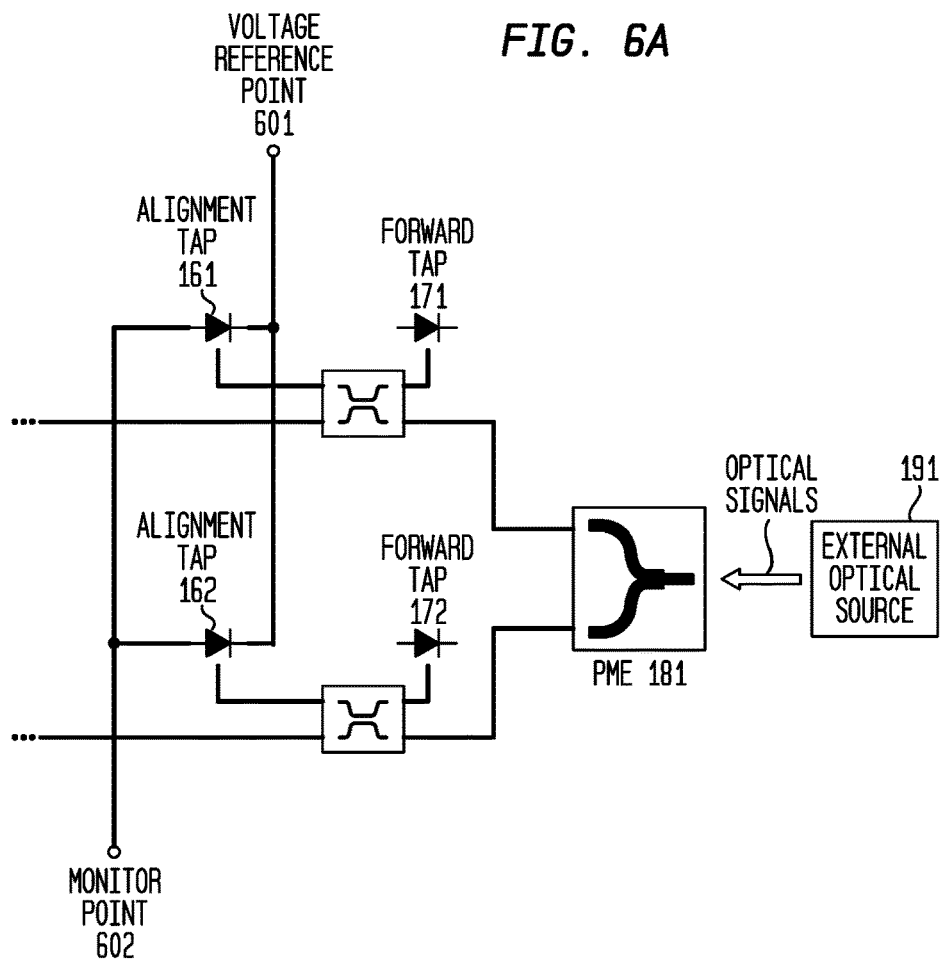
FIG. 6A illustrates monitoring current for aligning the PME to an external optical device, according to one embodiment herein.

FIG. 6A illustrates monitoring current for aligning the PME 181 to the external optical device 191, according to one embodiment herein. As shown, the external optical device 191 transmits optical signals to the PME 181 which splits and forwards the optical signals to the alignment taps 161 and 162. Each of the alignment taps 161 and 162 includes an integrated current detector (not shown in FIG. 6A). The alignment taps 161 and 162 feed power to the integrated current detectors such that current flows through the detectors. A power supply voltage (e.g., $V_{REF}$) provides power at the voltage reference point 601. When aligning the external source to the PME 181, the two integrated current detectors monitor the current flowing through the alignment taps 161 and 162 between the voltage reference point 601 and the monitor point 602 in order to identify the optimal alignment position.

Figure 6B:
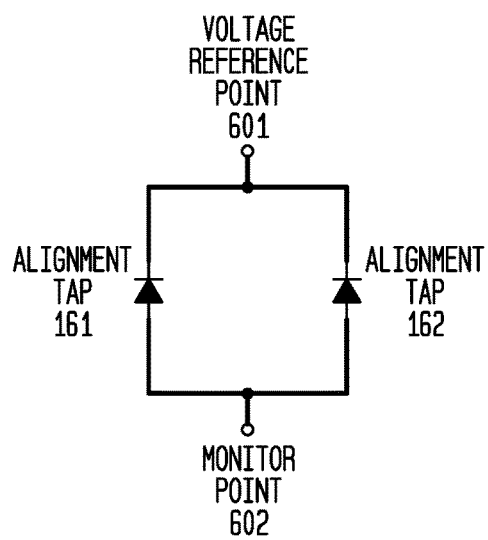
FIG. 6B illustrates wiring of alignment taps for aligning the PME to an external optical device, according to one embodiment herein.

FIG. 6B illustrates the wiring of the alignment taps 161 and 162 for aligning the PME 181 to the external optical device 191, according to one embodiment herein. As shown, the alignment taps 161 and 162 are wired in parallel. Moreover, the two current detectors integrated in the alignment taps 161 and 162 are also wired in parallel. Thus, the current at the monitor point 602 is the sum of the current measured by each of the integrated current detectors.

FIG. 7 illustrates a flowchart of a method 700 for transmitting two optical signals with different wavelengths, according to one embodiment herein. At block 701, the nanotaper 121 receives a first optical signal 113 from a first optical source 111. At block 702, the nanotaper 122 receives a second optical signal 114 from a second optical source 112. The second optical signal 114 has a different wavelength than the first optical signal 113. For example, the second optical signal 114 has a wavelength $\lambda_2$ which is different than the wavelength $\lambda_1$ of the first optical signal 113. At block 703, the optical modulator 141 modulates the first optical signal 113 in response to a first control signal 151. At block 704, the optical modulator 142 modulates the second optical signal 114 in response to a second control signal 152. At block 705, the combining stage 201 in the PME 181 combines the first and the second optical signals 113 and 114 into a single optical path. At block 706, the rotating stage 202 in the PME 181 polarizes the first optical signal 113 to have a different polarization than the second optical signal 114. For example, the rotating stage 202 polarizes the first optical signal 113 to change the first optical signal 113 from a TE mode optical signal to a TM mode optical signal. Also, the rotating stage 202 maintains the second optical signal 114 as a TE mode signal. Thus, the first and second optical signals 113 and 114 have orthogonal polarizations with respect to each other. At block 707, the nanotaper 203 in the PME 181 transmits the combined first and second optical signals 113 and 114 in a common waveguide 110 to an external optical device 191.

In view of the foregoing, the scope of the present disclosure is determined by the claims that follow.

The invention claimed is:

1. A photonic chip, comprising:
a first optical source configured to transmit a first optical signal comprising a first wavelength;
a second optical source configured to transmit a second optical signal comprising a second wavelength different than the first wavelength, wherein the first and second optical signals are confined in a same optical mode; and
a polarization multiplexing element coupled to outputs of the first and second optical sources, wherein the polarization multiplexing element is configured to:
receive the first and the second optical signals from the first and the second optical sources at respective inputs;
combine the first and the second optical signals into a single optical path while maintaining the first and second optical signals in the same optical mode;
polarize, after combining the first and second optical signals, the first optical signal to have a different polarization than the second optical signal; and
transmit the combined first and the second optical signals in a common waveguide.

2. The photonic chip of claim 1, wherein the polarization multiplexing element comprises a first waveguide path and a second waveguide path, wherein the first waveguide path is coupled to a first optical modulator in the photonic chip and the second waveguide path is coupled to a second optical modulator in the photonic chip, and wherein a width of the first waveguide path is narrower than a width of the second waveguide path.

3. The photonic chip of claim 1, wherein the polarization multiplexing element is configured to polarize the first optical signal such that the first optical signal and the second optical signal have orthogonal polarizations with respect to each other.

4. The photonic chip of claim 1, wherein the polarization multiplexing element is configured to polarize the first optical signal from a transverse electric (TE) mode optical signal to a transverse magnetic (TM) mode optical signal or configured to polarize the first optical signal from a TM mode optical signal to a TE mode optical signal.

5. The photonic chip of claim 1, wherein the polarization multiplexing element is configured to maintain the polarization of the second optical signal.

6. A photonic chip, comprising:
a first optical source configured to transmit a first optical signal comprising a first wavelength;
a second optical source configured to transmit a second optical signal comprising a second wavelength different than the first wavelength;
a polarization multiplexing element coupled to outputs of the first and second optical sources, wherein the polarization multiplexing element is configured to:
receive the first and the second optical signals from the first and the second optical sources at respective inputs;
combine the first and the second optical signals into a single optical path;
polarize the first optical signal to have a different polarization than the second optical signal; and
transmit the combined first and the second optical signals in a common waveguide,
wherein the polarization multiplexing element comprises a first waveguide path and a second waveguide path, wherein the first waveguide path is coupled to a first optical modulator in the photonic chip and the second waveguide path is coupled to a second optical modulator in the photonic chip, and wherein a width of the first waveguide path is narrower than a width of the second waveguide path; and
respective alignment taps between the first and second optical modulators and the polarization multiplexing element, and wherein the alignment taps are configured to align the polarization multiplexing element to an external optical device.

7. The photonic chip of claim 1, wherein the first optical signal comprises one or more optical signals each with a respective wavelength, and wherein the second optical signal comprises one or more optical signals each with a respective wavelength.

8. A system, comprising:
a first optical source configured to transmit a first optical signal, wherein the first optical signal comprises a first wavelength;
a second optical source configured to transmit a second optical signal, wherein the second optical signal comprises a second wavelength different than the first wavelength, wherein the first and second optical signals are confined in a same optical mode;
a photonic chip, comprising:
a polarization multiplexing element configured to:
receive the first and the second optical signals from the first and the second optical sources at respective inputs;
combine the first and the second optical signals into a single optical path while maintaining the first and second optical signals in the same optical mode;
polarize, after combining the first and second optical signals, the first optical signal to have a different polarization than the second optical signal; and
transmit the combined first and the second optical signals in a common waveguide.

9. The system of claim 8, wherein the polarization multiplexing element comprises a first waveguide path and a second waveguide path, wherein the first waveguide path is coupled to a first optical modulator in the photonic chip and the second waveguide path is coupled to a second optical modulator in the photonic chip, and wherein a width of the first waveguide path is narrower than a width of the second waveguide path.

10. The system of claim 8, wherein the polarization multiplexing element is configured to polarize the first optical signal such that the first optical signal and the second optical signal have orthogonal polarizations with respect to each other.

11. The system of claim 8, wherein the polarization multiplexing element is configured to polarize the first optical signal from a transverse electric (TE) mode optical signal to a transverse magnetic (TM) mode optical signal or configured to polarize the first optical signal from a TM mode optical signal to a TE mode optical signal.

12. The system of claim 8, wherein the polarization multiplexing element is configured to maintain the polarization of the second optical signal.

13. The system of claim 8, wherein the first and second optical sources comprise directly-modulated lasers.

14. The system of claim 8, wherein the first optical signal comprises one or more optical signals each with a respective wavelength, and wherein the second optical signal comprises one or more optical signals each with a respective wavelength.

15. A method, comprising:
receiving a first optical signal from a first optical source, wherein the first optical signal comprises a first wavelength;
receiving a second optical signal from a second optical source, where the second optical signal comprises a second wavelength different than the first wavelength, and wherein the first and second optical signals are confined in a same optical mode;
combining the first and the second optical signals into a single optical path using a polarization multiplexing element while maintaining the first and second optical signals in the same optical mode;
polarizing, after combining the first and second optical signals, the first optical signal to have a different polarization than the second optical signal using the polarization multiplexing element; and
transmitting the combined first and the second optical signals in a common waveguide.

16. The method of claim 15, wherein the polarization multiplexing element comprises a first waveguide path and a second waveguide path, wherein the first waveguide path is coupled to a first optical modulator and the second waveguide path is coupled to a second optical modulator, and wherein a width of the first waveguide path is narrower than a width of the second waveguide path.

17. The method of claim 15, wherein polarizing the first optical signal comprises polarizing the first optical signal from a transverse electric (TE) mode optical signal to a transverse magnetic (TM) mode optical signal.

18. The method of claim 15, wherein polarizing the first optical signal comprises polarizing the first optical signal from a TM mode optical signal to a TE mode optical signal.

19. The method of claim 15, further comprising maintaining the polarization of the second optical signal.

20. The method of claim 15, wherein the first optical signal comprises one or more optical signals each with a respective wavelength, and wherein the second optical signal comprises one or more optical signals each with a respective wavelength.

* * * * *